United States Patent
Miyazawa

(10) Patent No.: US 10,841,480 B2
(45) Date of Patent: Nov. 17, 2020

(54) IMAGING DEVICE, CONTROL METHOD OF IMAGING DEVICE, AND RECORDING MEDIUM STORING FOCUS ADJUSTMENT PROGRAM

(71) Applicant: Olympus Corporation, Hachioji (JP)

(72) Inventor: Shingo Miyazawa, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/416,112

(22) Filed: May 17, 2019

(65) Prior Publication Data
US 2019/0273860 A1 Sep. 5, 2019

Related U.S. Application Data

(63) Continuation of application No. PCT/JP2017/035820, filed on Oct. 2, 2017.

(30) Foreign Application Priority Data

Nov. 28, 2016 (JP) .................. 2016-230166

(51) Int. Cl.
*H04N 5/232* (2006.01)
*G02B 7/36* (2006.01)
(Continued)

(52) U.S. Cl.
CPC ........... *H04N 5/23212* (2013.01); *G02B 7/28* (2013.01); *G02B 7/36* (2013.01); *G03B 13/36* (2013.01);
(Continued)

(58) Field of Classification Search
None
See application file for complete search history.

(56) References Cited

U.S. PATENT DOCUMENTS 5,422,671 A * 6/1995 Yamada .................. G02B 7/36
348/345
5,604,538 A * 2/1997 Kaneda .................. G02B 7/28
348/345
(Continued)

FOREIGN PATENT DOCUMENTS

JP 57-208520 A 12/1982
JP 7-322129 A 12/1995
(Continued)

OTHER PUBLICATIONS

Translation of International Preliminary Report on Patentability to corresponding International Patent Application No. PCT/JP2017/035820, dated Jun. 6, 2019 (8 pgs.).
(Continued)

*Primary Examiner* — Quan Pham
(74) *Attorney, Agent, or Firm* — John C. Pokotylo; Pokotylo Patent Services

(57) ABSTRACT

An imaging device includes an image sensor and a controller. The controller sets a focus detection area and a motion detection area, determines an instability of a subject for a motion based on an imaging signal corresponding to an inside of the motion detection area, determines a degree of focusing based on the imaging signal corresponding to an inside of the focus detection area. The controller makes an operation parameter of a focus adjustment operation different, when the subject is determined to be unstable once and then determined to be stable. The controller determines the degree of focusing by a focus adjustment operation using minute driving. The operation parameter is an amplitude or an amount of a movement of the focus lens.

17 Claims, 12 Drawing Sheets

(51) Int. Cl.
  *G03B 13/36* (2006.01)
  *G02B 7/28* (2006.01)
(52) U.S. Cl.
  CPC ......... *H04N 5/232* (2013.01); *H04N 5/23254* (2013.01); *H04N 5/23267* (2013.01)

(56) References Cited

U.S. PATENT DOCUMENTS

| | | | | |
|---|---|---|---|---|
| 5,623,309 | A * | 4/1997 | Yoshimura | H04N 5/23212 348/355 |
| 2002/0154909 | A1* | 10/2002 | Yamazaki | H04N 5/23212 396/125 |
| 2007/0058966 | A1* | 3/2007 | Irinouchi | H04N 5/23254 396/153 |
| 2009/0066832 | A1* | 3/2009 | Hirasawa | H04N 5/23296 348/345 |

FOREIGN PATENT DOCUMENTS

| | | |
|---|---|---|
| JP | 2000-156849 A | 6/2000 |
| JP | 2003-215439 A | 7/2003 |
| JP | 2003-230043 | 8/2003 |
| JP | 2012-85199 A | 4/2012 |
| JP | 2016-38427 A | 3/2016 |

OTHER PUBLICATIONS

International Search Report from corresponding International Application No. PCT/JP2017/035820, dated Dec. 26, 2017 (3 pgs.), with translation (2 pgs.).

* cited by examiner

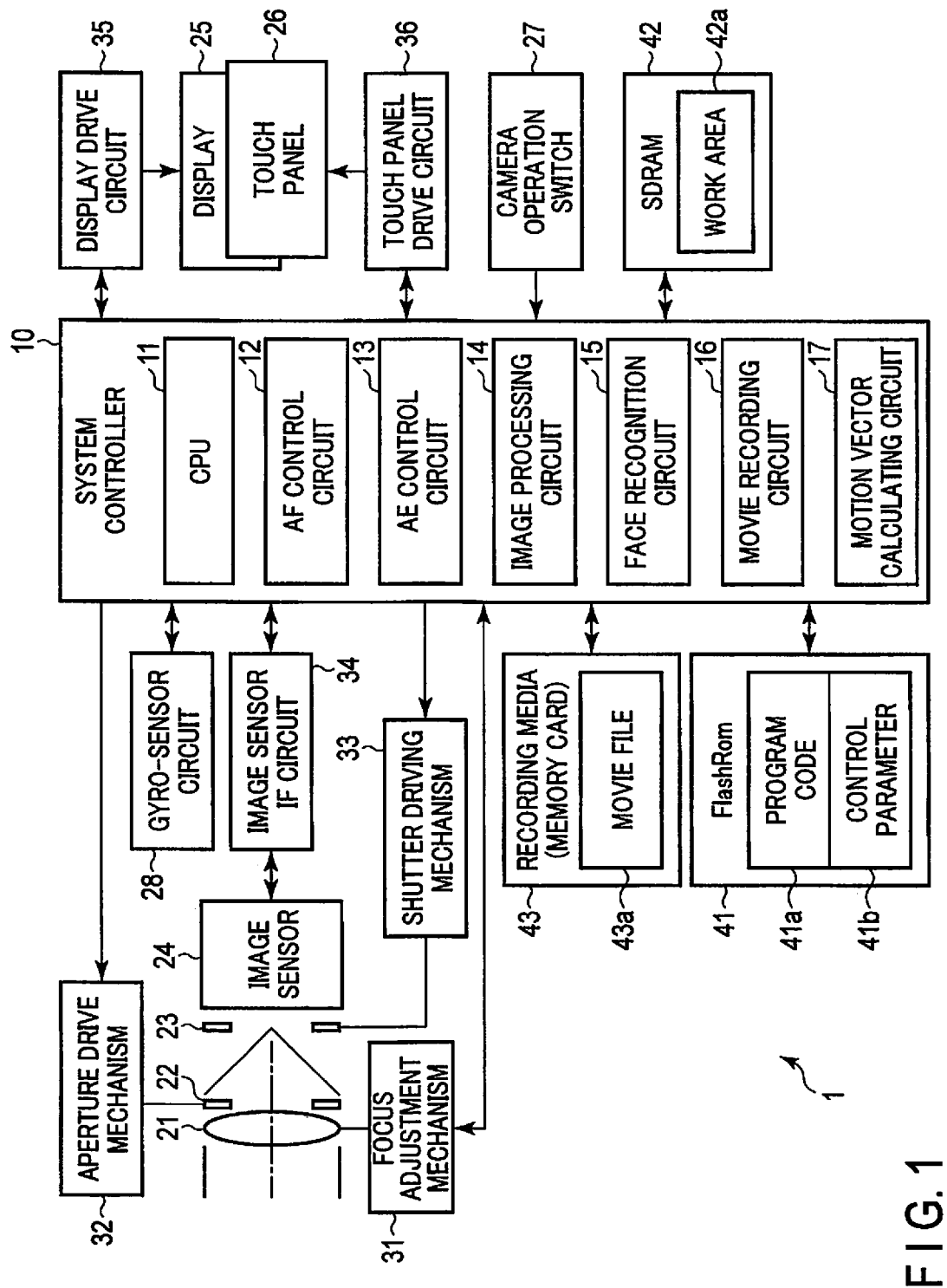
F I G. 1

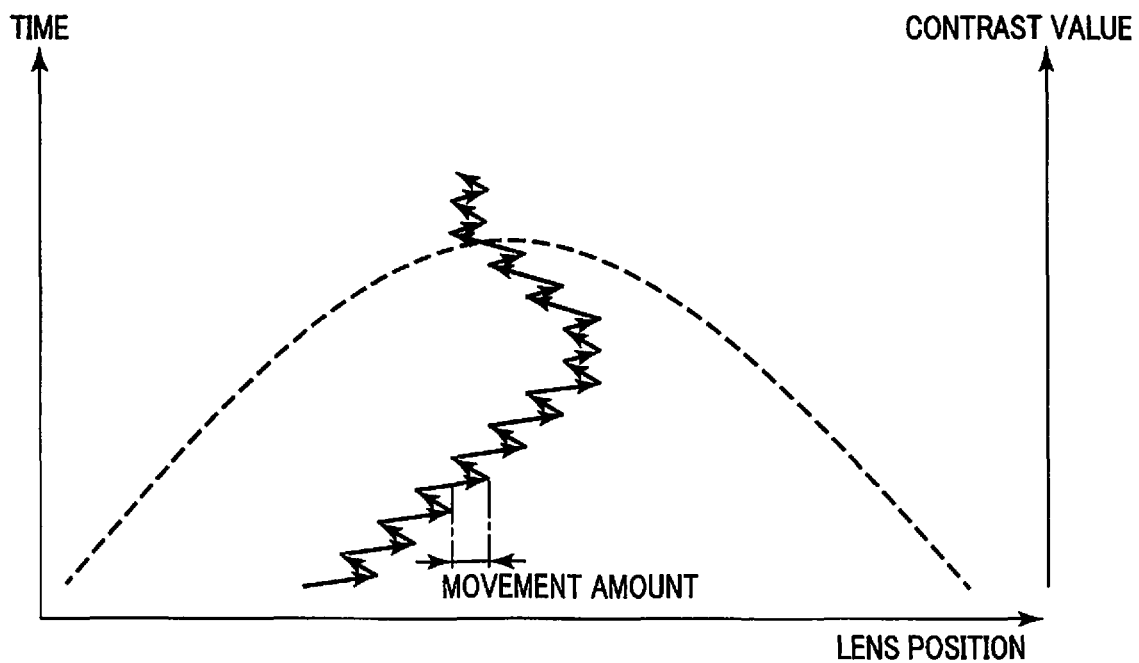
F I G. 4
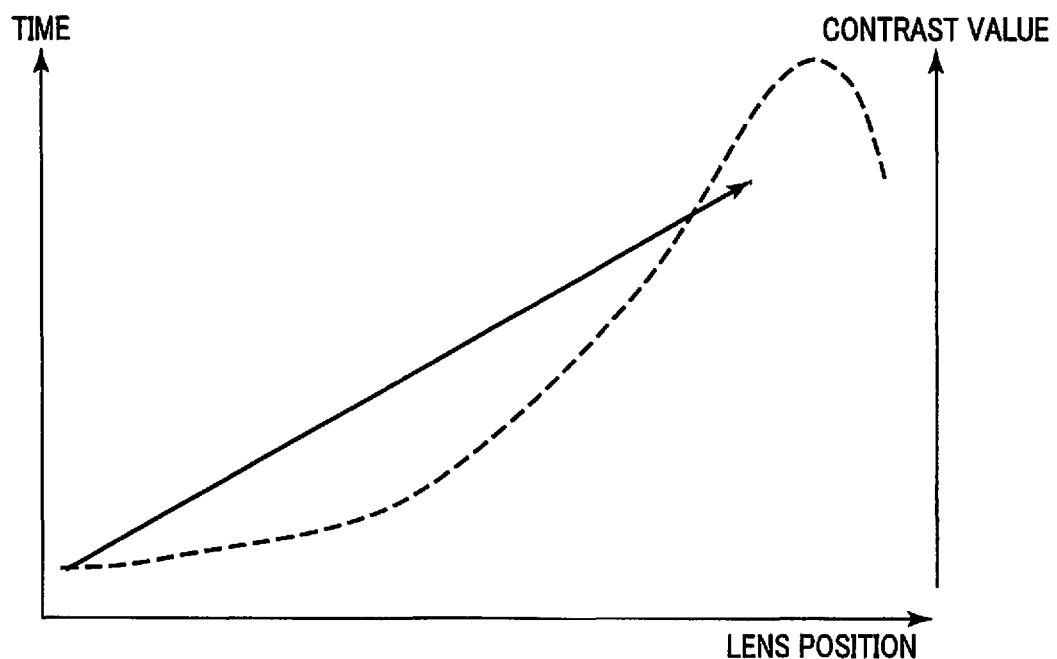
F I G. 5

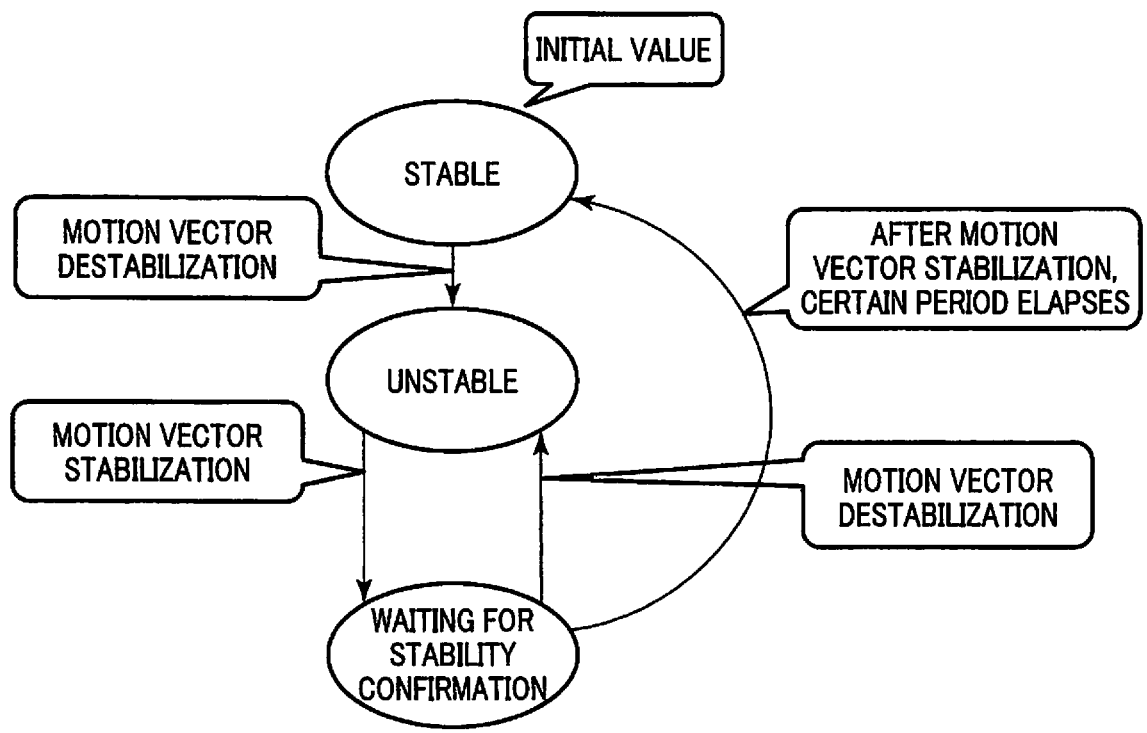
F I G. 11

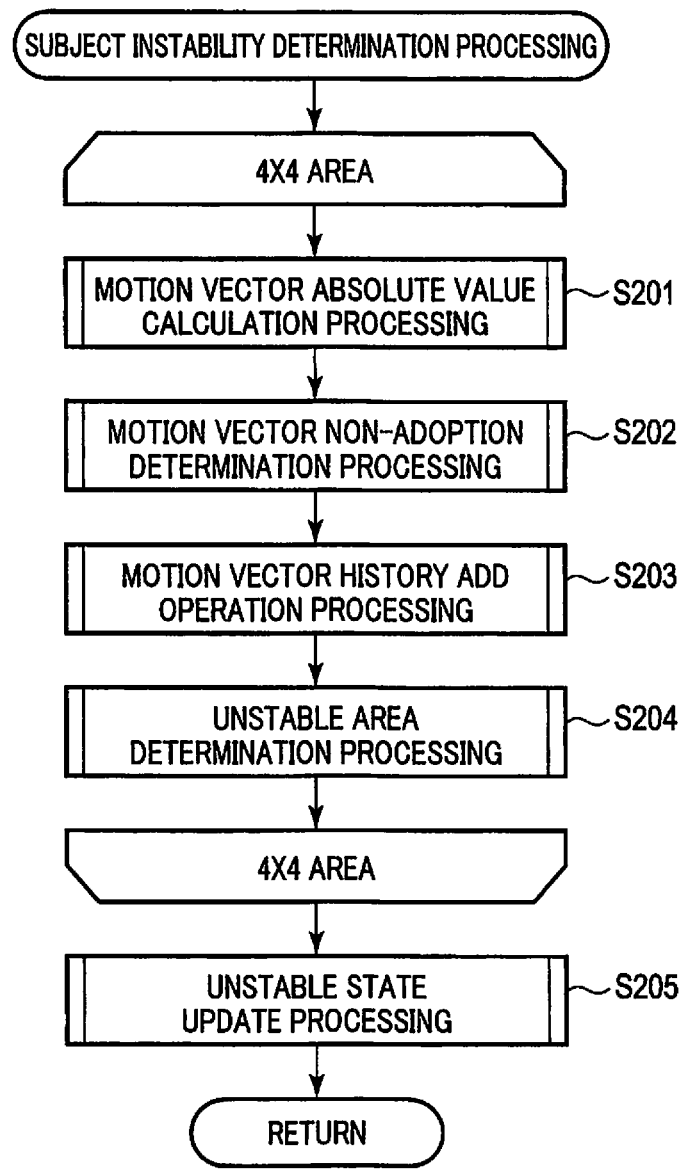
F I G. 12

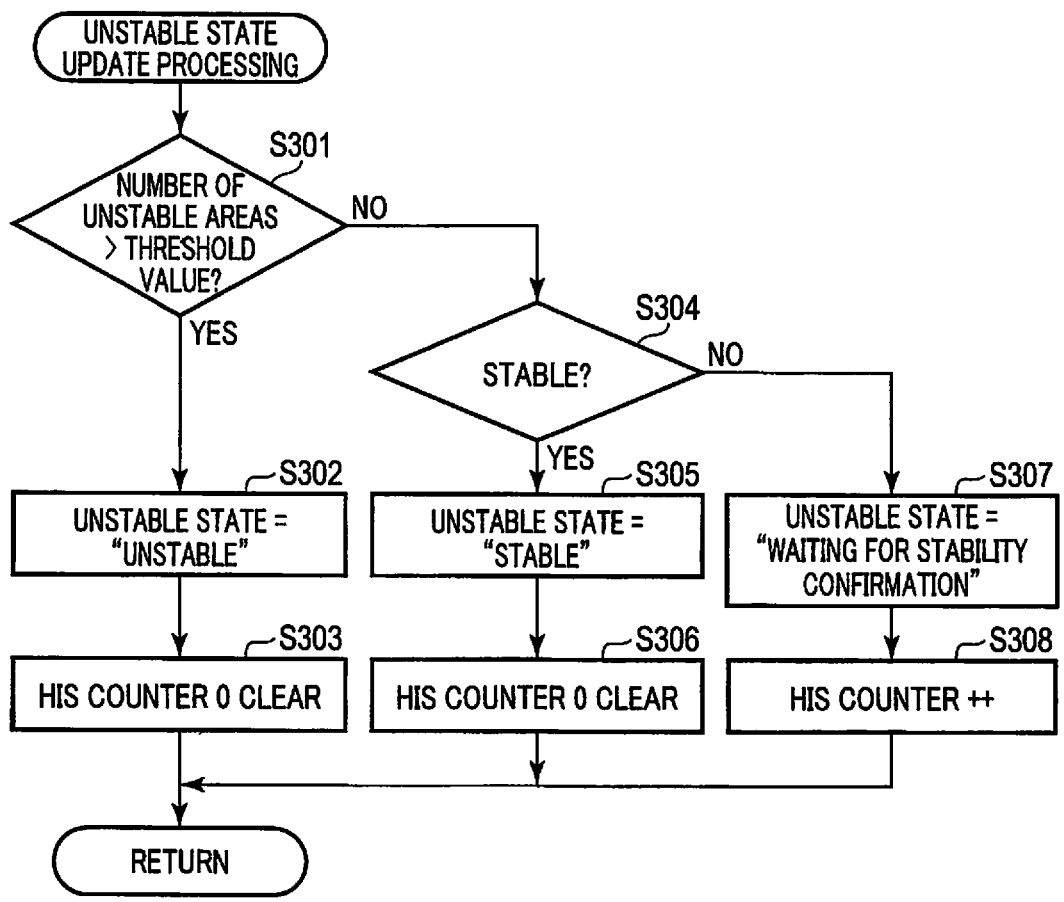
F I G. 13

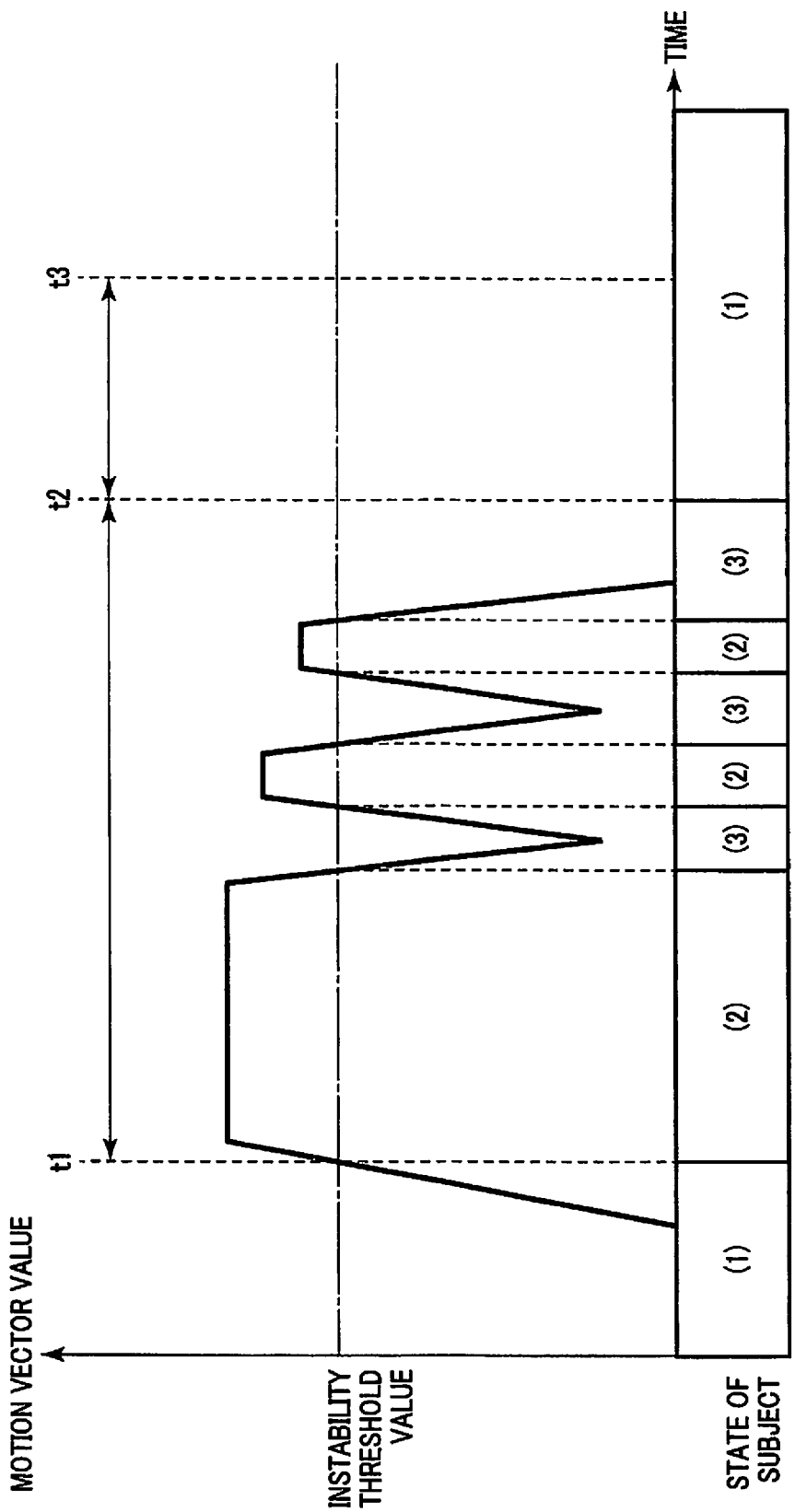
F I G. 16

IMAGING DEVICE, CONTROL METHOD OF IMAGING DEVICE, AND RECORDING MEDIUM STORING FOCUS ADJUSTMENT PROGRAM

CROSS-REFERENCE TO RELATED APPLICATIONS

This application is a Continuation Application of PCT Application No. PCT/JP2017/035820, filed Oct. 2, 2017 and based upon and claiming the benefit of priority from the prior Japanese Patent Application No. 2016-230166, filed Nov. 28, 2016, the entire contents of both of which are incorporated herein by reference.

FIELD

Exemplary embodiments relate to an imaging device, a control method of the imaging device, and a recording medium storing a focus adjustment program thereon.

BACKGROUND

In an imaging device, an autofocus (AF) function for moving a focus lens included in an imaging optical system, so as to focus on a subject, is already known. Within such an autofocus function, an erroneous operation of the AF tends to occur, for example, when the subject is moving. For this reason, for example, Jpn. Pat. Appln. KOKAI Publication No. 2003-230043 discloses stopping the AF operation upon detection of a motion of the subject. However, if the AF operation is stopped, it is no longer possible to maintain the focused state on the subject.

SUMMARY

According to a first aspect, there is provided an imaging device comprising: an image sensor configured to receive light from a subject through an imaging lens including a focus lens to generate an imaging signal of a predetermined imaging area; and a controller configured to: set a focus detection area in an inside of the imaging area, and a motion detection area, at least a part of which is included in the focus detection area; determine an instability of the subject for a motion based on the imaging signal corresponding to an inside of the motion detection area; determine a degree of focusing based on the imaging signal corresponding to an inside of the focus detection area; and perform a focus adjustment operation for moving the focus lens for focus adjustment based on the degree of focusing, wherein the controller stops the focus adjustment operation when the subject is determined to be unstable, starts the focus adjustment operation after the subject is determined to be stable, and makes an operation parameter of the focus adjustment operation different, when the subject is determined to be unstable once and the focus adjustment operation is stopped and when the subject is then determined to be stable and the focus adjustment operation is resumed, wherein the controller determines the degree of focusing by a focus adjustment operation using minute driving of moving a center of an amplitude while reciprocating the focus lens with a predetermined amplitude in the focus adjustment operation, and wherein the operation parameter is the amplitude or an amount of the movement of the focus lens.

According to a second aspect, there is provided a control method of an imaging device, comprising: receiving light from a subject through an imaging lens including a focus lens to generate an imaging signal of a predetermined imaging area; setting a focus detection area in an inside of the imaging area, and a motion detection area, at least a part of which is included in the focus detection area; determining an instability of the subject with respect to a motion based on the imaging signal corresponding to an inside of the motion detection area; determining a degree of focusing based on the imaging signal corresponding to an inside of the focus detection area; and performing a focus adjustment operation of moving the focus lens for focus adjustment based on the degree of focusing, wherein the focus adjustment operation is stopped when the subject is determined to be unstable, the focus adjustment operation is started after the subject is determined to be stable, and an operation parameter of the focus adjustment operation is made different when the subject is determined to be unstable once and the focus adjustment operation is stopped, and the subject is then determined to be stable and the focus adjustment operation is resumed, wherein in the focus adjustment operation, the focus adjustment operation is performed using minute driving of moving a center of an amplitude while reciprocating the focus lens with a predetermined amplitude to determine the degree of focusing, and wherein the operation parameter is the amplitude or an amount of the movement of the focus lens.

According to a third aspect, there is provided a computer-readable non-transitory recording medium which stores a focus adjustment program executed by a computer that acquires, from an image sensor that receives light from a subject through an imaging lens including a focus lens and generates an imaging signal of a predetermined imaging area, the imaging signal, wherein the focus adjustment program causes the computer to execute: setting a focus detection area in an inside of the imaging area, and a motion detection area, at least a part of which is included in the focus detection area; determining an instability of the subject with respect to a motion based on the imaging signal corresponding to an inside of the motion detection area; determining a degree of focusing based on the imaging signal corresponding to an inside of the focus detection area; performing a focus adjustment operation of moving the focus lens for focus adjustment based on the degree of focusing, wherein the focus adjustment operation is stopped when the subject is determined to be unstable, the focus adjustment operation is started after the subject is determined to be stable, and an operation parameter of the focus adjustment operation is made different when the subject is determined to be unstable once and the focus adjustment operation is stopped, and the subject is then determined to be stable and the focus adjustment operation is resumed; and in the focus adjustment operation, performing a focus adjustment operation using minute driving of moving a center of an amplitude while reciprocating the focus lens with a predetermined amplitude to determine the degree of focusing, and wherein the operation parameter is the amplitude or an amount of the movement of the focus lens.

Advantages of the embodiments will be set forth in the description which follows, and in part will be obvious from the description, or may be learned. The advantages may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments, and together with the general description given above and the detailed description of the embodiments given below, serve to explain the principles.

FIG. 1 is a block diagram schematically showing a configuration example of an imaging device according to an embodiment of the present invention.

FIG. 4 is a diagram for explaining the minute driving of the focus lens.

FIG. 5 is a diagram for explaining scan driving of the focus lens.

FIG. 11 is a diagram for explaining a transition of a subject stable state.

FIG. 12 is a flowchart showing an outline of an example of subject instability determination processing.

FIG. 13 is a flowchart showing an outline of an example of unstable state update processing.

FIG. 16 is a schematic diagram for explaining an outline of an operation of the imaging device.

DETAILED DESCRIPTION

Figure 2:
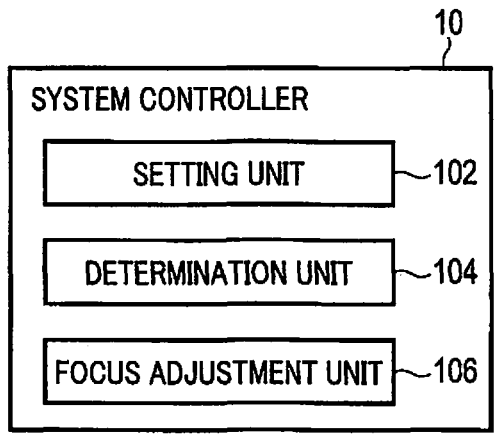
FIG. 2 is a diagram showing an example of a part of functions included in a system controller of the imaging device according to the embodiment.

An embodiment of the present invention will be described with reference to the drawings. The imaging device according to the present embodiment has an autofocus (AF) function of a contrast evaluation system of determining the degree of focusing based on a contrast value relating to a subject at the time of movie image capturing and adjusting a focusing position of a focus lens. In the present imaging device, when the AF operation tends to be unstable, such as when the subject moves during the AF operation, the AF operation is stopped and the quality of the AF is maintained. In the present imaging device, on the other hand, in order to maintain followability of the AF, the necessary AF operation is performed even when the subject moves, etc.

[Configuration of Imaging Device]

A configuration example of an imaging device 1 according to the present embodiment is shown in FIG. 1. As shown in FIG. 1, the imaging device 1 includes a system controller 10 that controls an operation of each unit of the imaging device 1. Further, the imaging device 1 includes a lens group 21, an aperture 22, a shutter 23, an image sensor 24, a focus adjustment mechanism 31, an aperture drive mechanism 32, a shutter driving mechanism 33, and an image sensor IF circuit 34.

The lens group 21 as an imaging lens includes a plurality of lenses. The lens group 21 includes a focus lens for adjusting a focus. By the focus lens moving in an optical axis direction, a focus of a subject image formed on the image sensor 24 is adjusted. The aperture 22 adjusts an amount of light incident on the image sensor 24 via the lens group 21. An optical system including the lens group 21 and the aperture 22, etc. may be configured as an interchangeable lens attachable/detachable with respect to a main body of the imaging device 1. The shutter 23 is provided on a front surface of the image sensor 24, and controls the incidence of light to the image sensor 24 via the lens group 21. The image sensor 24 includes, for example, a CCD image sensor or a CMOS image sensor, etc. The image sensor 24 receives a light flux passing through the lens group 21 (that is, the subject image formed by the lens group 21), and creates an imaging signal through photoelectric conversion.

Under the control of the system controller 10, the focus adjustment mechanism 31 moves the focus lens included in the lens group 21 in the optical axis direction in order to adjust the focus. The aperture drive mechanism 32 drives the aperture 22 under the control of the system controller 10. The shutter driving mechanism 33 drives the shutter 23 under the control of the system controller 10. The image sensor IF circuit 34 reads the imaging signal from the image sensor 24, and outputs image data converted into a digital signal to the system controller 10.

The imaging device 1 further includes a display 25, a touch panel 26, a display drive circuit 35, a touch panel drive circuit 36, a camera operation switch 27, and a gyro-sensor circuit 28.

The display 25 includes, for example, a liquid crystal display. The display 25 displays various images, such as a live view image, a photographed image, and an operation screen. The touch panel 26 is provided on the display 25, and acquires a touch input by a user.

The display drive circuit 35 controls a display operation by the display 25 under the control of the system controller 10. The touch panel drive circuit 36 controls the acquisition of the touch input by the touch panel 26, under the control of the system controller 10.

The camera operation switch 27 includes, for example, a release switch, a recording button, an arrow key for performing various inputs, etc. The camera operation switch 27 acquires an input by the user, and transmits the input to the system controller 10.

The gyro-sensor circuit 28 detects the motion of the imaging device 1. The gyro-sensor circuit 28 transmits information relating to the motion of the imaging device 1 to the system controller 10. The gyro-sensor circuit 28 may include not only an angular velocity sensor that detects an angular velocity but also an acceleration sensor. The gyro-sensor circuit 28 functions as, for example, a camera shake detection unit.

The imaging device 1 further includes a Flash Rom 41, an SDRAM 42, and a recording medium 43. The Flash Rom 41 records, for example, a program code 41a and a control parameter 41b for controlling the operation of the imaging device 1, which are used by the system controller 10. The SDRAM 42 is provided with a Work Area 42a, which is a storage area used for computation by the system controller 10. The recording medium 43 records a still image file and a movie file 43a captured by the imaging device 1. The recording medium 43 is freely attachable/detachable with respect to the imaging device 1.

The system controller 10 includes a Central Processing Unit (CPU) 11, an AF control circuit 12, an AE control circuit 13, an image processing circuit 14, a face recognition circuit 15, a movie recording circuit 16, a motion vector calculating circuit 17.

The CPU 11 performs various computations using the program code 41a and the control parameter 41b recorded in the Flash Rom 41. The AF control circuit 12 performs various computations relating to the AF, and controls the operation of the focus adjustment mechanism 31, etc. The AE control circuit 13 performs various computations relating to an exposure control, and controls operations of the aperture drive mechanism 32, the shutter driving mechanism 33, etc. The image processing circuit 14 performs image processing on the image data generated by the image sensor 24 and acquired via the image sensor IF circuit 34. The face recognition circuit 15 performs face recognition processing in order to recognize a face included in the subject captured by the image sensor 24. The movie recording circuit 16 records the movie data generated by the image sensor 24, acquired via the image sensor IF circuit 34, and image-processed by the image processing circuit 14, on the recording medium 43. The motion vector calculating circuit 17 calculates a motion vector relating to the subject captured by the image sensor 24. The AF control circuit 12, the AE control circuit 13, the image processing circuit 14, the face recognition circuit 15, the movie recording circuit 16, the motion vector calculating circuit 17, etc. can be constituted by, for example, an Application Specific Integrated Circuit (ASIC), etc.

Within the system controller 10 according to the present embodiment, a function according to the focus adjustment will be described with reference to a functional block diagram shown in FIG. 2. As shown in FIG. 2, the system controller 10 includes functions as a setting unit 102, a determination unit 104, and a focus adjustment unit 106. These functions are realized by the CPU 11, the AF control circuit 12, the motion vector calculating circuit 17, etc. The setting unit 102 sets a focus detection area within an imaging area represented by an imaging signal generated by the image sensor 24, and sets a motion detection area, at least a part of which is included in the focus detection area. The determination unit 104 determines the instability of the subject with respect to the motion relating to an inside of the motion detection area. The focus adjustment unit 106 determines the degree of focusing inside the focus detection area, and performs a focus adjustment operation to move the focus lens included in the lens group 21 for the focus adjustment based on the degree of focusing.

[Outline of Operation of Imaging Device]

An outline of the operation relating to the AF of the imaging device 1 according to the present embodiment will be described. In the present embodiment, the AF operation, in particular, during movie image capturing will be described. In movie image capturing, since all motions of the focus lens during the AF operation are recorded as movie images, a stable AF operation with particularly good appearance is required. In the imaging device 1, there are three kinds of phases which comprise phases of the AF operation. That is to say: a minute driving phase (minute driving; minute driving operation), a search phase (search; search operation), and a standby phase (standby; standby operation).

The AF operation performed in the minute driving phase will be described with reference to FIGS. 3 and 4. In the minute driving phase, the focus lens is, for example, minutely moved alternately in an infinite focus direction and a nearest focus direction for each frame. By moving a center position of a reciprocating motion gradually while reciprocating minutely in such a way, a fine adjustment of the focus and determination of a direction of the focusing position are performed. Such an operation of the focus lens will be referred to as a minute driving operation. Note that the minute driving operation is also referred to as a wobbling operation.

Figure 3:
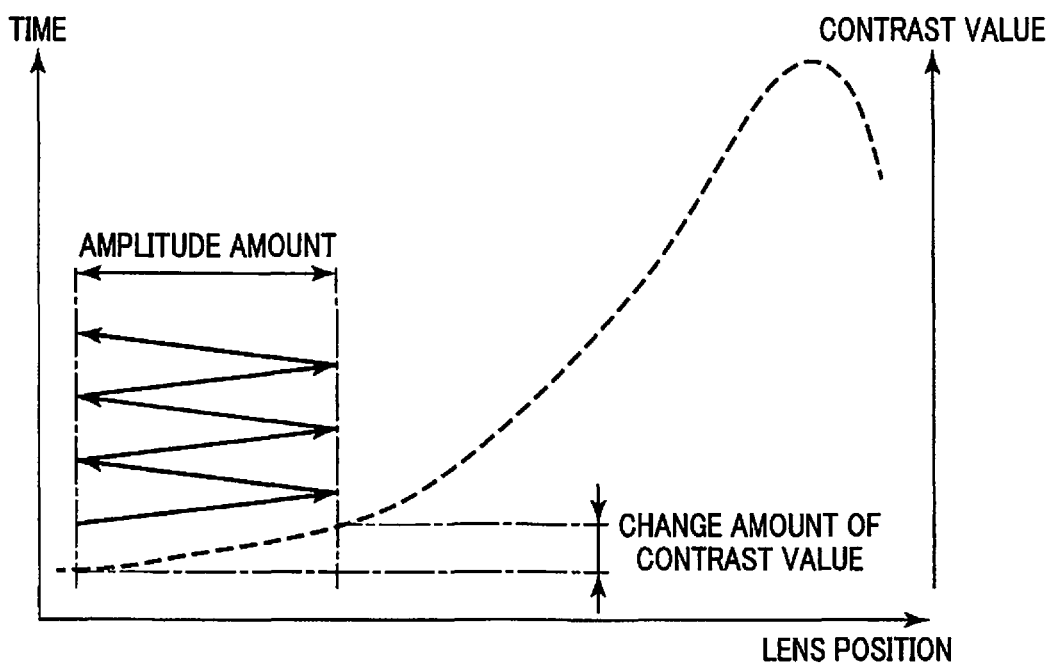
FIG. 3 is a diagram for explaining minute driving of a focus lens.

FIG. 3 is a diagram for explaining a method of determining a direction of a focusing position via a minute driving operation. In FIG. 3, a solid line shows a change in lens position with respect to time, and a broken line shows a contrast value of an image obtained with respect to a lens position. As shown by the solid line in FIG. 3, when the lens position moves alternately in an infinite focus direction and a nearest focus direction, a change in the contrast value is obtained. Based on this change in the contrast value, the direction of the focusing position can be determined. Among the infinite focus direction and the nearest focus direction, the direction in which the contrast value increases is the direction of the focusing position.

FIG. 4 is a diagram for explaining a method of fine adjustment of the focus by a minute driving operation. In FIG. 4, a solid line shows a change in lens position with respect to time, and a broken line shows a change in contrast value of an image obtained with respect to the lens position. When performing the fine adjustment of the focus, as shown in FIG. 4, the center position of the fluctuation of the lens position, to be moved in the infinite focus direction and the nearest focus direction, gradually moves. This movement is performed so that the contrast value is maximized based on the information acquired on the contrast value. By this movement, the focus is finely adjusted.

The AF operation performed in the search phase will be described with reference to FIG. 5. In FIG. 5, a solid line shows a change in lens position with respect to time, and a broken line shows a change in contrast value of an image obtained with respect to the lens position. In the search phase, the focus lens continuously moves in one direction. Such driving of the focus lens will be referred to as scan driving (search operation). When the focus lens is scan driven, the contrast value changes according to the degree of focusing. The focusing position can also be searched by the scan driving. In addition, since the focus lens moves only in one direction, a movement of the focus lens by the scan driving is faster than a movement of the focus lens by the minute driving.

The standby phase is a control state in which a change of the subject, etc. is monitored without performing lens driving. A state in which the degree of focusing is evaluated without performing the lens driving in this way will be referred to as a standby operation.

Figure 6:
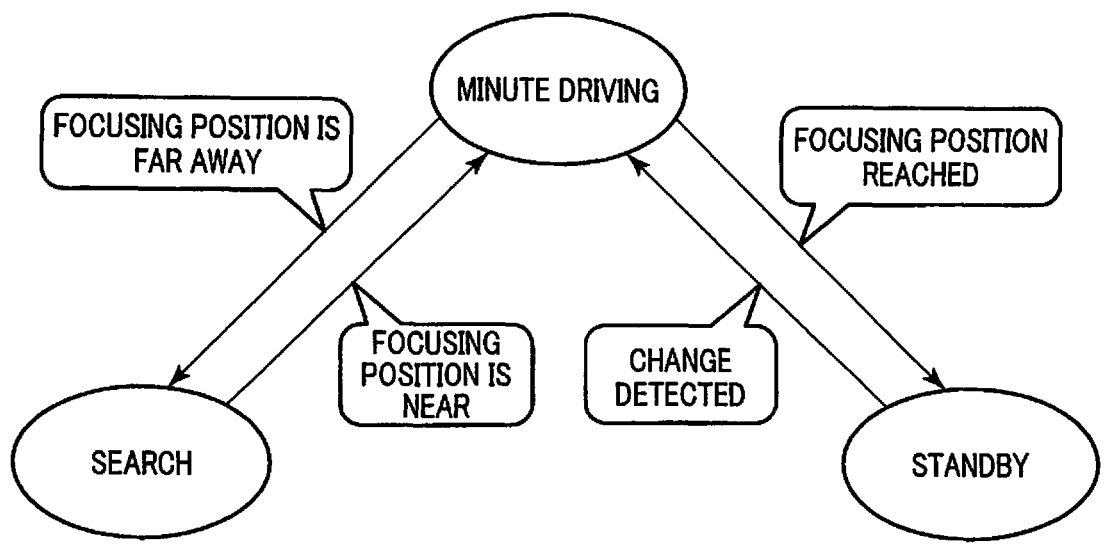
FIG. 6 is a diagram for explaining an outline of state transitions among a minute driving phase, a search phase, and a standby phase.

Next, a transition of the phase of the AF operation will be described with reference to FIG. 6. During movie image capturing, the imaging device 1 of the present embodiment operates so as to always focus on a subject as the movie image AF. In the movie image AF, the imaging device 1 continues the operation while causing a control phase to transition. As described above, the control phase according to the present embodiment includes the minute driving phase (minute driving), the search phase (search), and the standby phase (standby). At the start of movie image recording, control is started from the minute driving phase.

In the minute driving phase, when it is determined that the lens position of the focus lens is far from the focusing position, i.e., when it is determined that a peak of the contrast value is far away, the operation phase transitions to the search phase. By transitioning to the search phase, the lens position quickly moves to the focusing position. On the other hand, when it is determined that the lens position reaches the focusing position in the minute driving phase, the operation phase transitions to the standby phase and the lens driving is stopped.

In the search phase, when it is determined that the lens position is in the vicinity of the focusing position, i.e., when it is determined that the contrast value is in the vicinity of the peak, the operation phase transitions to the minute driving phase. Thereafter, the lens position is moved to the focusing position by the minute driving operation.

In the standby phase, for example, when the motion of the imaging device 1 is detected by the gyro-sensor circuit 28, when a change in contrast value or change in face information occurs in the image (that is, when a change is detected), the operation phase transitions to the minute driving phase. In order to maintain a focused state, the minute driving operation is resumed.

Figure 7:
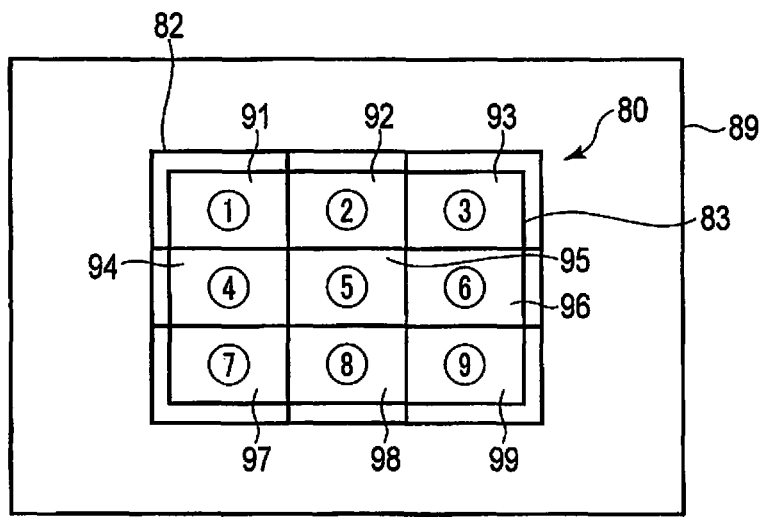
FIG. 7 is a diagram for explaining an outline of an example of an AF area group.

Here, an AF area group 80 used in the present embodiment will be described with reference to FIG. 7. The AF area group 80 including a plurality of focus detection areas is provided in an imaging area 89. The AF area group 80 includes a middle area 82 and nine small areas 83. Of the small areas 83, areas on an upper-left side, an upper center, an upper-right side, a middle-left side, a middle center, a middle-right side, a lower-left side, a lower center, and a lower-right side are referred to as a first small area 91, a second small area 92, a third small area 93, a fourth small area 94, a fifth small area 95, a sixth small area 96, a seventh small area 97, an eighth small area 98, and a ninth small area 99, respectively. By the middle area 82 and the nine small areas 83 being combined and used as AF areas, which are a total of 10 focus detection areas, appropriate AF operations can be performed for various subjects.

Figure 8:
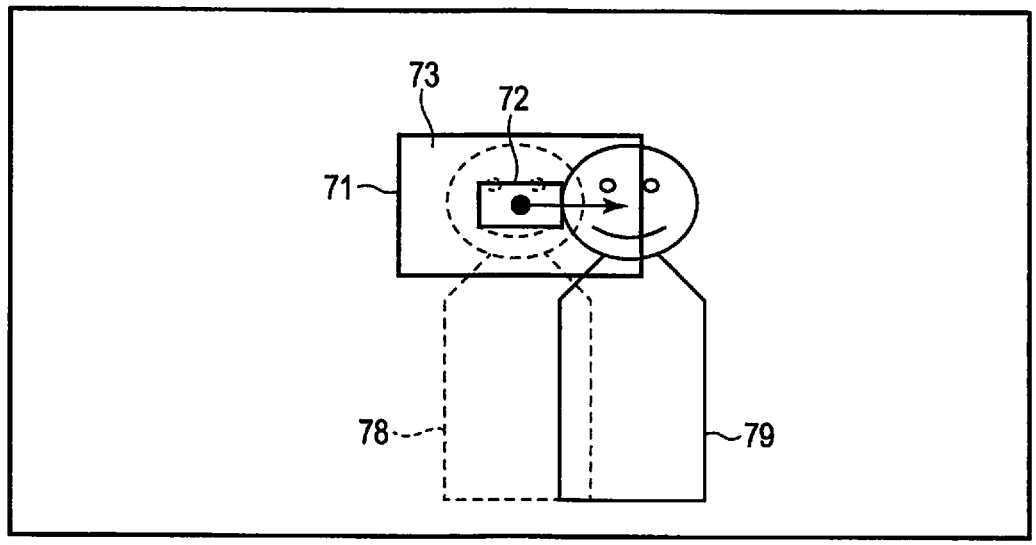
FIG. 8 is a diagram for explaining a motion vector.

Next, detection of a motion vector will be described with reference to FIG. 8. The motion vector is, in consecutive images obtained by continuous photographing, a vector representing a direction and an amount of movement of a feature point, obtained by searching in a subsequent image a feature point strongly correlated with a feature point in a previous image. For determining the motion vector, a motion vector detection area 71 is used as a motion detection area. In FIG. 8, a person 78 indicated by a broken line shows a position of the subject of interest in a preceding image of two consecutive images, and a person 79 shown by a solid line shows a position of the subject of interest in a succeeding image of the two consecutive images. The motion vector detection area 71 includes an evaluation area 72 arranged at a center of the motion vector detection area 71, and a search area 73 provided around the evaluation area 72. In the determination of the motion vector, an image of the evaluation area 72 is designated as a feature point in the preceding image, and a feature point strongly correlated with said feature point is searched within the search area 73 in the succeeding image. A vector connecting the evaluation area 72 of the preceding image and the feature point searched for in the succeeding image is a motion vector. In the present embodiment, the motion vector is used for evaluating the stability of the subject.

Figure 9:
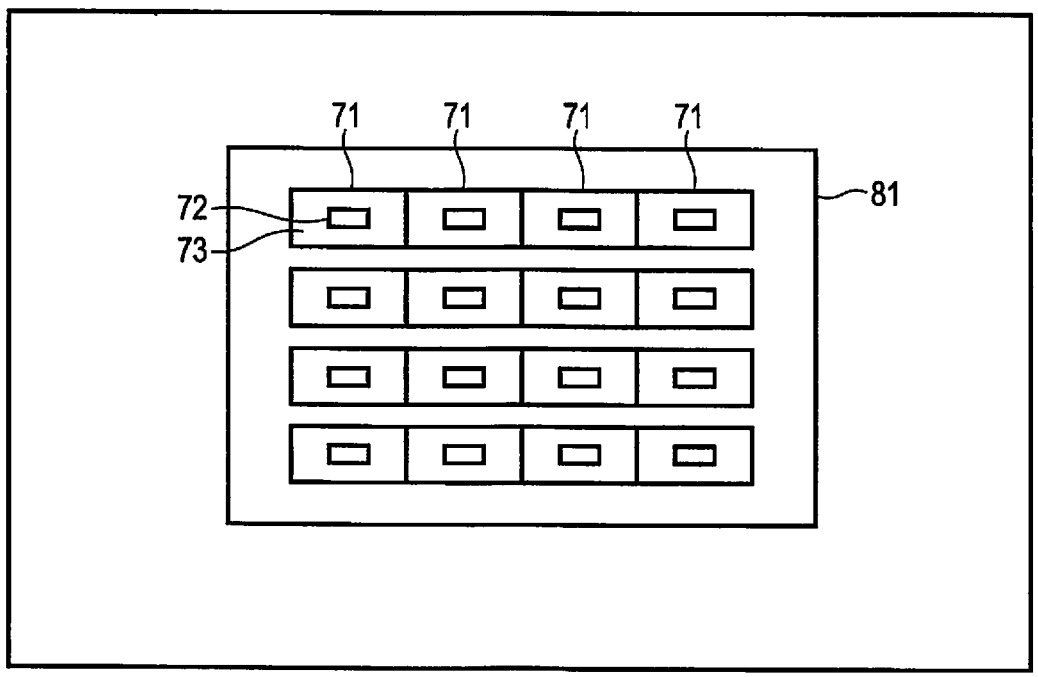
FIG. 9 is a diagram for explaining an outline of an example of an arrangement of motion vector detection areas.

The arrangement of the motion vector detection area 71 will be described with reference to FIG. 9. In the present embodiment, the motion vector detection area 71 is set according to the position of the AF area 81 as the above-described middle area 82 or small area 83. It is desirable that the motion vector detection area 71 can widely cover the inside of the AF area 81. If a range covered by the motion vector detection area 71 in the AF area 81 is narrow, there is a possibility that a motion of the subject that affects a contrast value which is an AF evaluation value cannot be detected. On the other hand, the motion vector detection area 71 may be extended to the outside of the AF area 81, but it is necessary to pay attention so that the motion of the subject not directly affecting the AF evaluation value does not come to be detected. In the present embodiment, a plurality of motion vector detection areas 71 are provided in one AF area 81. For example, as shown in FIG. 9, a total of 16 motion vector detection areas 71 are provided in one AF area 81 in 4 rows×4 columns. As one motion vector detection area 71 is small and the number of areas is large, it is possible to detect a fine motion of the subject. However, because a computational load is correspondingly increased, a size and the number of the motion vector detection areas 71 are set in consideration of processing capability of the motion vector calculating circuit 17 and necessary detection accuracy.

[AF Operation of Imaging Device]

Figure 10:
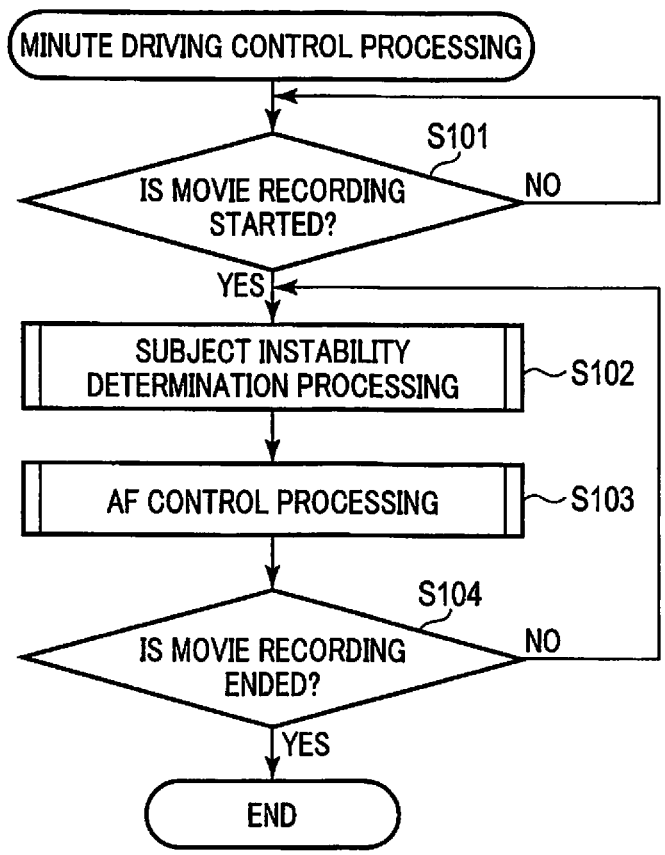
FIG. 10 is a flowchart showing an outline of an example of minute driving control processing.

An operation relating to the AF in the minute driving phase of the imaging device 1 will be described. FIG. 10 is a diagram showing an outline of an example of minute driving control processing during movie image capturing.

In step S101, the CPU 11 determines whether or not movie image recording is started. For example, when a recording button (which is one of the camera operation switches 27) is pressed, movie image recording is started. When it is determined that the movie image recording is not started, the process repeats step S101 and stands by. On the other hand, when it is determined that the movie image recording is started, the process proceeds to step S102. When the movie image recording is started, the image sensor 24 receives light from the subject via the lens group 21 including the focus lens, and generates an imaging signal. This imaging signal is subjected to image processing by the image processing circuit 14, recorded on the recording medium 43, or displayed on the display 25.

In step S102, the system controller 10 performs subject instability determination processing. As will be described in detail later, the subject instability determination processing is processing of determining whether the state of the subject is "stable", "unstable", or "waiting for stability confirmation."

In step S103, the system controller 10 performs AF control processing. The AF control processing is processing of obtaining a focused state of a subject, obtaining a direction and an amount of movement of a focus lens included in the lens group 21 necessary for focusing, and moving the focus lens.

In step S104, the CPU 11 determines whether or not the movie image recording is ended. For example, when the recording button is pressed again, the movie image recording ends. When it is determined that the movie image recording is not ended, the process returns to step S102, and the subject instability determination processing and the AF control processing are repeated. The repetition processing of steps S102 to S104 is performed, for example, for each frame of the movie image capturing. On the other hand, when it is determined that the movie image recording is ended, the minute driving control processing ends.

The subject instability determination processing performed in step S102 will be described with reference to FIG. 11. Three states, "stable", "unstable", and "waiting for stability confirmation," are defined as states relating to the instability of the subject. A stable state is a state in which the subject is stable. A stable state is assumed at the start of determination. An unstable state is a state in which the subject is unstable. In the stable state, when the motion vector is destabilized, the state transitions to the unstable state. A state of waiting for stability confirmation is a state soon after the unstable subject stabilizes. That is, in the unstable state, when the motion vector is stabilized, the state transitions to the state of waiting for stability confirmation. In the state of waiting for stability confirmation, when the motion vector is destabilized, the state transitions to the unstable state. In the state of waiting for stability confirmation, when a predetermined period of time elapses while the motion vector remains stable, the state transitions to the stable state. In the subject instability determination processing, the state in which the instability of the subject is ("stable", "unstable", and "waiting for stability confirmation") is decided. In the present embodiment, the AF operation is performed only when the instability of the subject is determined to be stable. When emphasis of followability of AF rather than the stability of AF is desired, the AF operation may be performed even in the state of waiting for stability confirmation.

The subject instability determination processing will be described with reference to a flowchart shown in FIG. 12. The processing from step S201 to step S204 takes the form of repetition processing performed on each of the motion vector detection areas 71 in total of 16 in 4 rows×4 columns, and is a computation related to a motion vector.

In step S201, the motion vector calculating circuit 17 performs motion vector absolute value calculation processing. The motion vector calculating circuit 17 takes absolute values for a value of a motion vector in an X-direction and a value of a motion vector in a Y-direction, and adds these absolute values together. The value obtained in this way is set as an instability evaluation value for evaluating the instability of the subject. That is, when an X direction motion vector in a certain motion vector detection area "area" is vec_x[area], a Y direction motion vector is vec_y[area], and a function taking an absolute value is abs(X), an instability evaluation value unstable_val[area] is expressed by unstable_val[area]=abs(vec_x[area])+abs(vec_y[area]).

Since the instability evaluation value is a value for determining the instability of the subject, absolute values of the values of the motion vectors in the X direction and the Y direction are added together.

For example, in the imaging device 1 in which phase difference pixels for detecting a phase difference of the subject image are arranged on the image sensor 24 and the phase difference is calculated based on an output of the phase difference pixels, a distance from the imaging device 1 to the subject is obtained based on the phase difference. In this case, the same computation may be performed together with the motion vectors in the X direction and the Y direction, with a difference between frames of a calculated distance measurement value (depth data) as a motion vector in a depth direction.

In step S202, the motion vector calculating circuit 17 performs motion vector non-adoption determination processing. In the present embodiment, when a reliability of a detection result of the motion vector is low, the motion vector calculating circuit 17 does not reflect the detection result of the motion vector in the determination. In addition, the motion vector calculating circuit 17 does not use motion vector information when the state of the subject or the imaging device 1 satisfies a predetermined condition. More specifically, the predetermined condition is determined based on following conditions (1) to (3).

(1) When it is determined that the contrast of the subject in the motion vector detection area is low (2) When it is determined that the subject in the motion vector detection area is a periodic subject (3) When the motion of the imaging device 1 is being detected by the gyro-sensor circuit 28

When any one of the conditions (1) to (3) is satisfied, the motion vector is not adopted, and the instability evaluation value unstable_val[area] is set to 0. When none of the conditions (1) to (3) is satisfied, the motion vector is adopted, and the value calculated in step S201 is decided as the instability evaluation value unstable_val[area].

When it is determined that the contrast of the subject within the motion vector detection area 71 is low as the condition (1), the reliability of the motion vector detection is low. Since it is not preferable to perform processing based on a value with low reliability, the instability evaluation value unstable_val[area] is set to 0. Also, when the contrast of the subject is low, there is a possibility that the subject will be blurred in a defocusing state. In such a case, since it is not preferable that the AF operation is stopped after being evaluated to be unstable, the instability evaluation value unstable_val[area] is set to 0.

When it is determined that the subject in the motion vector detection area 71 is a periodic subject as the condition (2), the reliability of the motion vector detection is low. That is, when targeting a periodic subject, a plurality of points having a strong correlation with a feature point can be detected. For this reason, the reliability of the motion vector detection is lowered. As a method of determining whether or not a subject has periodicity, a method of determining that a subject has periodicity when there is a large variation in correlation values of feature points within an area is known.

When the motion is being detected by the gyro-sensor circuit 28 as the condition (3), since the subject changes according to the motion of the imaging device 1, the motion vector is also detected. However, when the user is moving the imaging device 1, there is a high possibility that the user is following the subject which is moving. When following the moving subject, the instability evaluation value unstable_val[area] is set to 0 so as to actively perform the AF operation even if there is some instability.

In step S203, the motion vector calculating circuit 17 performs motion vector history add operation processing. That is, the motion vector calculating circuit 17 adds the instability evaluation value unstable_val[area] corresponding to a predetermined frame, and calculates a history addition value which is a total value. The number of frames to be added is, for example, 8 frames. By this history addition, an influence due to an erroneous detection of the motion vector is reduced.

In step S204, the motion vector calculating circuit 17 performs unstable area determination processing. When the history addition value calculated in step S203 exceeds a predetermined threshold value, the motion vector calculating circuit 17 determines that the subject in the motion vector detection area 71 is unstable. When it is determined to be unstable, the motion vector calculating circuit 17 increments an unstable area count. The unstable area count is a value for counting the number of the motion vector detection areas 71, in which it is determined that the subject is unstable, among a plurality of motion vector detection areas 71. When it is determined that the subject in the motion vector detection area 71 is not unstable, the motion vector calculating circuit 17 does not change the unstable area count.

When the processing in steps S201 to S204 is performed for all the motion vector detection areas 71, the number of the motion vector detection areas 71, in which it is determined that the subject is unstable, is found as the unstable area count.

In step S205, the CPU 11 performs unstable state update processing using the unstable area count. The unstable state update processing will be described with reference to a flowchart shown in FIG. 13.

In step S301, the CPU 11 determines whether or not the unstable area count is larger than a predetermined threshold value. For example, when the number of the motion vector detection areas 71 is 16 as described above, the threshold value is set to 2, for example. When the unstable area count is larger than the threshold value, the process proceeds to step S302. In step S302, the CPU 11 sets the unstable state parameter indicating the instability of the subject to "unstable". In step S303, the CPU 11 clears the HIS counter for measuring the period of waiting for stability confirmation to 0. Whereby, the unstable state update processing ends.

When it is determined in step S301 that the unstable area count is not larger than the threshold value, the process proceeds to step S304. In step S304, the CPU 11 determines whether or not the subject is stable. When the current unstable state parameter is set to "stable", it is determined to be stable. Further, when the value of the HIS counter becomes larger than the predetermined threshold value, it is considered that the subject is firmly stabilized, and it is determined that the subject is stable. Here, the predetermined threshold value is, for example, 5. When it is determined to be stable, the process proceeds to step S305. In step S305, the CPU 11 sets the unstable state parameter to "stable". In step S306, the CPU 11 clears the HIS counter to 0. Whereby, the unstable state update processing ends.

When it is determined in step S304 that it is not stable, the process proceeds to step S307. At this time, there is a possibility that the subject is not yet firmly stabilized. Therefore, in step S307, the CPU 11 sets the unstable state parameter to "waiting for stability confirmation". In step S308, the CPU 11 increments the HIS counter. Whereby, the unstable state update processing ends.

Through the subject instability determination processing, the unstable state parameter is determined to be "stable", "unstable", or "waiting for stability confirmation". In the present embodiment, when the number of unstable areas changes from the state exceeding the threshold value to the threshold value or less, the unstable state parameter is set to "waiting for stability confirmation" until the value of the HIS counter exceeds the threshold value, and when the value of the HIS counter exceeds the threshold value, the unstable state parameter is set to "stable". In this way, a grace period is provided for the state transition from the unstable state to the stable state. Provision of such a grace period ensures that the alternative and consecutive switching of the unstable state parameter between stable and unstable is prevented.

Figure 14:
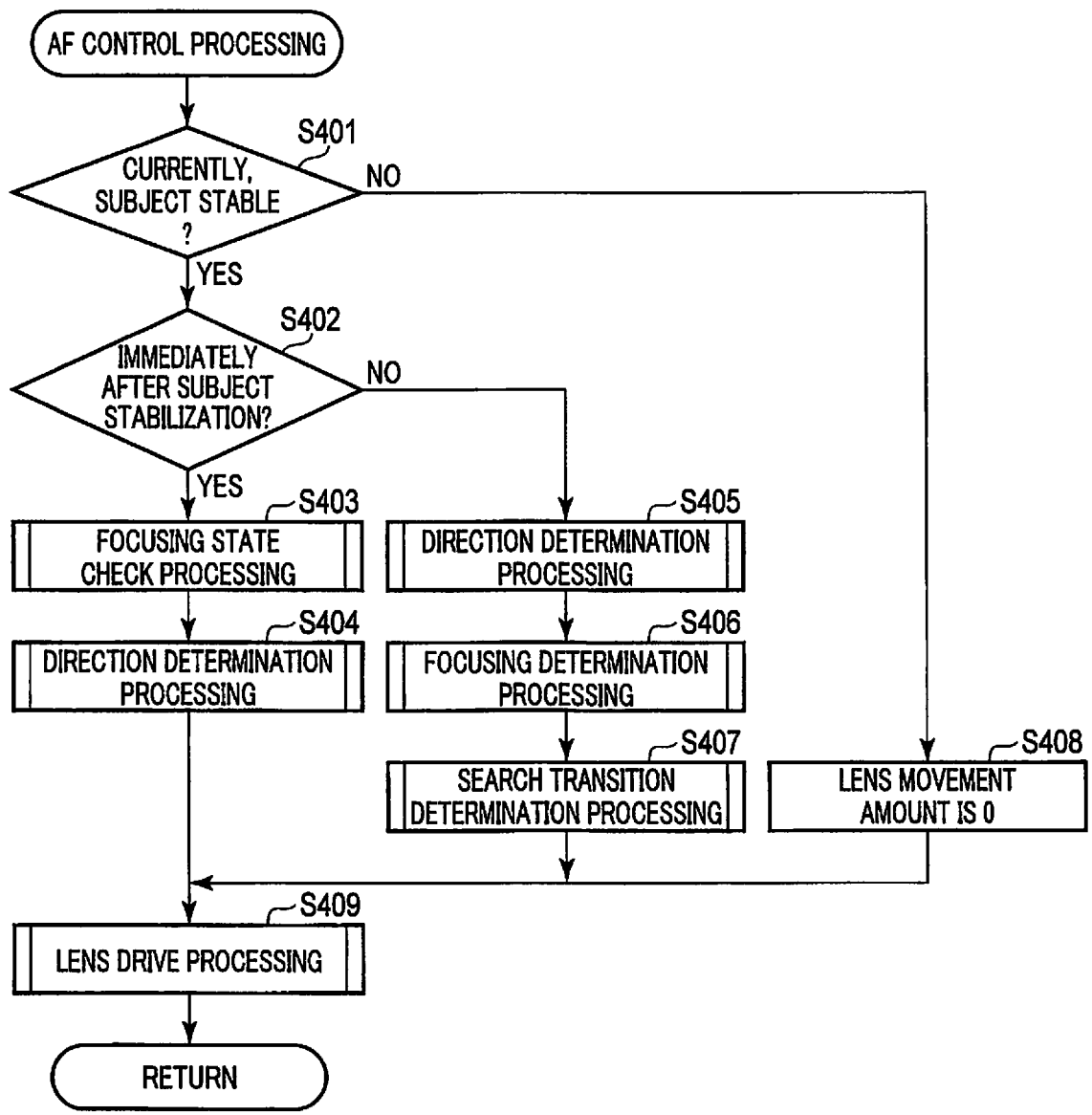
FIG. 14 is a flowchart showing an outline of an example of AF control processing.

The AF control processing performed in step S103 will be described with reference to a flowchart shown in FIG. 14.

In step S401, the AF control circuit 12 determines whether or not the unstable state parameter of the current subject is stable with respect to the unstable state determined in step S102. When it is determined to be stable, the process proceeds to step S402.

In step S402, the AF control circuit 12 determines whether or not it is immediately after the unstable state parameter of the subject becomes stable. Here, the case where the first determination of step S402 after the unstable state parameter changes to stable, or the focus state check processing (to be described later) is being continued, is determined as immediately after becoming stable. In step S402, by distinguishing that the unstable state parameter is previously waiting for stability confirmation but is stable this time, it is determined that this is the first time after changing to stable. In addition, if it is 1 on the flag of a focus state check processing continuation, it is determined that it is being continued. At the time immediately after becoming stable, the process proceeds to step S403.

In step S403, the AF control circuit 12 performs the focus state check processing. The focus state check processing is a process of checking both whether the subject changes and the focused state, since there is a possibility that the subject may change when the unstable state parameter of the subject changes from waiting for stability confirmation to stable, i.e., when the subject changes from an unstable state to a stable state.

In the focus state check processing, the focus lens is moved largely in comparison with cases of the other operations. Since the subject is in a state immediately after transitioning from an unstable state to a stable state, an influence exerted on an appearance of the movie image becomes relatively small even if the focusing position moves somewhat largely. Thus, the amount of movement of the focus lens can be relatively increased.

Figure 15:
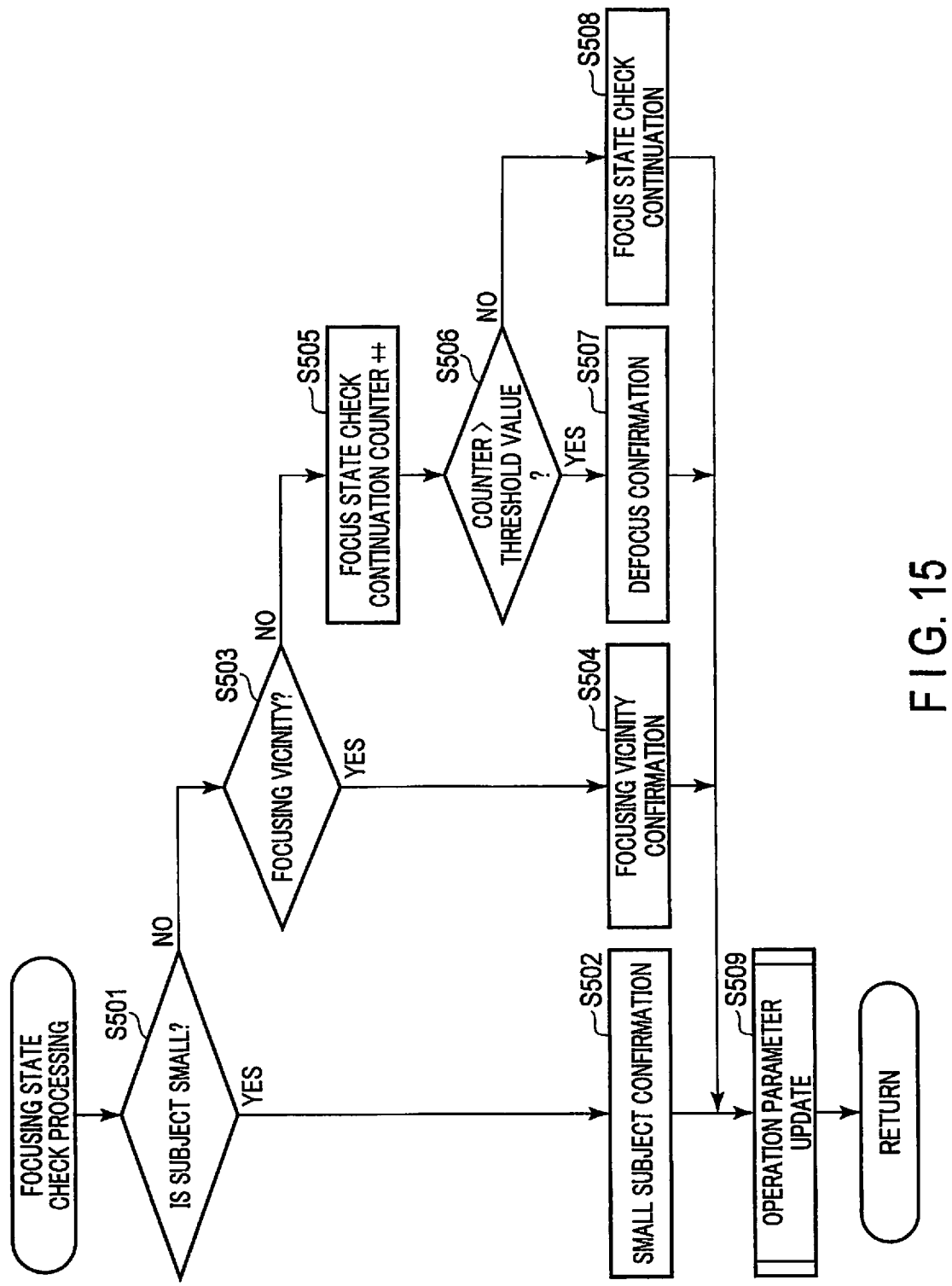
FIG. 15 is a flowchart showing an outline of an example of focus state check processing.

The focus state check processing will be described with reference to a flowchart shown in FIG. 15.

In step S501, the AF control circuit 12 determines whether or not there is a possibility that a main subject is small in comparison with a size of a currently-used AF area 81. When the main subject is smaller than the AF area 81, the main subject and a background are mixed within the AF area 81. As a result, the position of the focus lens is fixed so as to be in focus on the background, and there is a concern that the main subject may not be focused on. On the other hand, if the AF area 81 is smaller than the main subject, the contrast information becomes more susceptible to subject blur, camera shake, etc., and there is a concern that the AF operation may become unstable. Therefore, in the present embodiment, the AF area 81 is set to small only when the main subject is small. When it is determined that the main subject is small in comparison with the size of the AF area 81, the process proceeds to step S502. In step S502, the AF control circuit 12 confirms that the subject is a small subject. Thereafter, the process proceeds to step S509.

The determination as to whether the main subject is small or not may be performed as follows, for example. That is, based on each of the AF areas 81 having one area including the other area which have different areas, such as, for example, the fifth small area 95 and the middle area 82, a direction to move the focus lens for focusing is calculated. When the obtained moving direction of the focus lens of the one area is opposite to that of the other area, it can be determined that the main subject is a small subject. In this case, there is a high possibility that the main subject and the background are mixed.

When it is determined in step S501 that the main subject is no smaller in size than the AF area 81, the process proceeds to step S503. In step S503, the AF control circuit 12 determines whether or not the focal position is already in the vicinity of focusing when the state of the subject stabilizes. When the focal position is in the vicinity of the focusing, it is preferable to make a flicker of the focal position change less conspicuous by suppressing the amount of movement of the focus lens to be small. For example, when any one of the following three conditions is satisfied, it is determined that the focal position is in the vicinity of the focusing.

(1) an absolute value of an AF evaluation value (contrast value) is no less than a predetermined value (2) a change of a contrast value, which passes through a high-pass filter having a high cutoff frequency and is larger than a predetermined value, is detected (3) when a phase difference detection pixel is provided in the image sensor 24, etc., an amount of defocus calculated based on the phase difference is within a predetermined value When it is determined that the focal position is in the vicinity of the focusing position, the process proceeds to step S504. In step S504, the AF control circuit 12 confirms that the focal position is in the vicinity of the focusing position. Thereafter, the process proceeds to step S509.

If it is determined in step S503 that the focal position is not in the vicinity of the focusing position, the process proceeds to step S505. In step S505, the AF control circuit 12 increments a focus state check continuation counter. Thereafter, the process proceeds to step S506. The focus state check continuation counter and a focus state check continuation flag are initialized at the beginning of the minute driving control processing.

In step S506, the AF control circuit 12 determines whether or not the value of the focus state check continuation counter is larger than a predetermined threshold value. When a predetermined period elapses while it is unconfirmed that the subject is a small subject or that the focal position is in the vicinity of the focusing position, it is estimated that the subject is in an out-of-focus state or experiencing a somewhat irregular occurrence. When the value of the focus state confirmation continuation counter is larger than the predetermined threshold value, the process proceeds to step S507. In step S507, the AF control circuit 12 confirms that it is in a defocusing state. In addition, the focus state check continuation counter and the focus state check continuation flag are cleared. Thereafter, the process proceeds to step S509.

If it is determined in step S506 that the value of the focus state check continuation counter is no larger than the predetermined threshold value, the process proceeds to step S508. In step S508, the AF control circuit 12 determines to continue the focus state check processing. Further, the focus state check continuation flag is set. As a result, in the determination of step S402, it is determined that it is immediately after the subject stabilizes, and the focus state check processing is repeatedly performed. In this way, as long as the focus state check processing is continued, it is treated as being immediately after the state of the subject is stabilized, and transition to the standby operation and transition to the search operation (to be described later) are prohibited in the meantime.

In step S509, the AF control circuit 12 updates operation parameters relating to the AF based on a result of the above determination. The operation parameters to be updated here include, for example, the size of the AF area 81, an amount of lens movement, the transition to the search phase, etc. Table 1 shows an example of setting of the operation parameters.

TABLE 1

| DETERMINATION RESULTS | OPERATION PARAMETERS | | |
|---|---|---|---|
| | AF AREA SIZE | LENS MOVEMENT AMOUNT | TRANSITION TO SEARCH |
| SMALL SUBJECT | SMALL | MIDDLE | SUPPRESSED |
| VISINITY OF FOCUSING POSITION | MIDLLE | SMALL | SUPPRESSED |
| DEFOCUS | MIDDLE | LARGE | PROMOTED |
| FOCUS STATE CHECK | MIDDLE | MIDDLE | — |

As in this example, when the subject is a small subject, the size of the AF area 81 is set to any one of the small areas 83 which are the small-sized AF areas 81. In the case where the focal position is in the vicinity of the focusing position, the case of being in the defocusing state, and the case where the focus state check processing is being continued (which are the other cases), it is set to the medium area 82, which is the medium-sized AF area 81.

As the amount of movement of the lens, an amplitude which is a distance between a near focus side and an infinite focus side when the focus lens reciprocates or an amount of movement of an amplitude center, etc. can be set as follows. That is, the amount of lens movement is set so as to decrease the amount of a single lens movement when the focal position is in the vicinity of the focusing position, and is set so as to increase the amount of a single lens movement when in the defocusing state. When the subject is a small subject and when the focus state check processing is being continued, the amount of a single lens movement is set to medium.

The transition to the search phase is suppressed when the subject is a small subject and when the focal position is in the vicinity of the focusing position. Also, the transition to the search phase is promoted when in the defocusing state.

After updating the operation parameters in step S509, the process returns to the AF control processing described with reference to FIG. 14. After the focus state check processing in step S403, the process proceeds to step S404.

In step S404, the AF control circuit 12 performs direction determination processing. In the direction determination processing, the AF control circuit 12 determines a direction of the focusing position based on current moving direction of the focus lens and change in contrast value. After the direction determination processing in step S404, the process proceeds to step S409.

If it is determined in step S402 that it is not immediately after the unstable state parameter of the subject becomes stable, the process proceeds to step S405. In step S405, the AF control circuit 12 performs the direction determination processing. In the direction determination processing, the AF control circuit 12 determines the direction of the focusing position based on the current moving direction of the focus lens and change in contrast value.

In step S406, the AF control circuit 12 performs focusing determination processing. In the focusing determination processing, the AF control circuit 12 checks whether or not the current focus lens position is a focusing position. When it is in the vicinity of the focusing position, the AF control circuit 12 sets the phase of the AF operation to the standby phase. For example, in the case where the focus lens is moved in the direction of increasing the contrast value, when an inversion of the moving direction of the focus lens is repeated within a certain range, it can be specified that the vicinity of a center of said movement of the focus lens is the focusing position. When the phase of the AF operation transitions to the standby phase, the minute driving control processing described here is ended. When not transitioning to the standby phase, the process proceeds to step S407.

In the present embodiment, the focusing determination processing in step S406 is performed only when the subject state is stable and it is not immediately after the stabilization. Therefore, it is determined that the subject is in focus and the operation phase of the AF is transitioned to the standby phase, only when a predetermined time elapses after the subject state is stabilized. Furthermore, the stability of the AF may be further improved by setting a timer to measure an elapsed time after the subject state is stabilized and prohibiting the transition to the standby phase for a predetermined time.

In step S407, the AF control circuit 12 performs search transition determination processing. That is, the AF control circuit 12 determines whether or not the current lens position of the focus lens is far away from the focusing position. If it is far away, the AF control circuit 12 shifts the operation phase of the AF to the search phase. By transitioning to the search phase, the lens position can be quickly moved to the focusing position. When the phase of the AF operation transitions to the search phase, the minute driving control processing described here is ended. When not transitioning to the search phase, the process proceeds to step S409.

When a result of the focus state check processing is such that the subject is a small subject and the focal position is in the vicinity of the focusing position, the transition to the search phase is suppressed. After the processing in step S407, the process proceeds to step S409.

In the present embodiment, the search transition determination processing in step S407 is performed only when the subject state is stable and not immediately after the stabilization. Accordingly, it is determined that it is far away from the focusing position and the operation phase of the AF is transitioned to the search phase, only when a predetermined time elapses after the subject state is stabilized. Furthermore, the stability of the AF may be further improved by setting a timer to measure an elapsed time after the subject state is stabilized and prohibiting the transition to the search phase for a predetermined time.

When it is determined in step S401 that the current unstable state parameter of the subject is not stable, i.e., when the unstable state parameter is waiting for stability confirmation or unstable, the process proceeds to step S408. In step S408, the AF control circuit 12 sets the amount of movement of the focus lens to 0. That is, the AF operation is stopped. When the state of the AF operation is in the state of minute driving, a vibration amplitude of the focus lens may be maintained as it is, and the amount of movement of a central position of the vibration may be set to 0. Thereafter, the process proceeds to step S409.

In step S409, the CPU 11 performs lens drive processing. The CPU 11 moves the focus lens by the amount of movement determined by various determination processing in a direction determined by the focus state check processing in step S403, the direction determination processing in step S404 or S405, etc.

Thereafter, the AF control processing ends, and the process returns to the minute driving control processing described with reference to FIG. 10.

An outline of the operation of the imaging device 1 according to the present embodiment will be described with reference to a schematic diagram shown in FIG. 16. In FIG. 16, a horizontal axis indicates an elapsed time, and a vertical axis indicates a motion vector value to be detected. A period of (1) shown as the state of the subject at the bottom portion of the graph is a period during which the unstable state parameter is determined to be stable, a period of (2) is a period during which the unstable state parameter is determined to be unstable, and a period of (3) is a period during which the unstable state parameter is determined to be waiting for stability confirmation.

Until time t1, the value of the motion vector is small, and the subject is stable. At this time, the AF operation by minute driving is performed. It is assumed that the value of the motion vector exceeds an unstable threshold value at the time t1. The state of the subject is determined to be unstable after the time t1.

Thereafter, when the value of the motion vector is larger than the unstable threshold value, the state of the subject continues to be determined as unstable. On the other hand, when the value of the motion vector becomes equal to or less than the unstable threshold value, the state of the subject becomes waiting for stability confirmation. When the value of the motion vector becomes larger than the unstable threshold value before the predetermined period elapses in the state of waiting for the stability confirmation, the state of the subject is determined again to be unstable. When the predetermined period elapses in the state of waiting for stability confirmation, the state of the subject becomes stable. In FIG. 16, at time t2, the state of the subject becomes stable. In the present embodiment, the AF operation is stopped from the time t1 to the time t2 during which the subject is unstable or waiting for stability confirmation. At the time t2, the AF operation resumes, and the AF operation continues until the value of the motion vector exceeds the unstable threshold value. On the other hand, the AF operation phase is not changed to the standby phase or the search phase from the time t2 to the time t3, which is until a predetermined period elapses after the state of the subject changes to stable. After the time t3, the AF operation phase can be changed to the standby phase or the search phase depending on the situation.

According to the imaging device 1 according to the present embodiment, the stability of the AF operation is improved by using the information of the motion vector. That is, since the imaging device 1 does not perform an unnecessary AF operation when the subject is unstable, the stability of the AF operation is improved. On the other hand, since the imaging device 1 performs a necessary AF operation, followability of the AF does not deteriorate.

Furthermore, when it is determined that the subject is stable after being determined to be unstable, the imaging device 1 resumes the AF operation after confirming that the subject does not immediately return to an unstable state; that is, that the stable state continues for a predetermined period, without resuming the AF operation immediately. Therefore, the stability of the AF operation is further improved.

The imaging device 1 grasps the state of focusing at the time of resume of the AF, and adjusts the operation parameter of the AF according to the state. As a result of this adjustment, the followability of the AF does not deteriorate, and deterioration of a movie image quality due to a flicker of a focal position change is suppressed. Immediately after the AF operation by the minute driving resumes, the imaging device 1 does not transition to the search phase or the standby phase. As a result, the AF operation is further stabilized.

The above-described embodiment has focused on describing movie image capturing in particular. However, the present invention is not limited to movie image capturing, but also obviously works in a similar fashion for an AF operation during live view display for still image capturing.

In the above-described embodiment, the contrast AF evaluation method for evaluating the degree of focusing based on the contrast of an image has been described, but the present invention is not limited thereto. The above-described technique for altering whether or not to perform the AF operation by evaluating the stability of the subject, etc. can be similarly applied to a phase difference AF evaluation method for evaluating a degree of focusing based on a phase difference of a subject image.

In addition, in the above-described embodiment, the case of minute driving has been described as an example in particular, but the above technique is not limited to being applied to the case where the focus lens moves so as to reciprocate. For example, it can also be applied to a case where a focus is adjusted by moving a focus lens relatively (stepwise). In this case, the lens driving amount described as an amplitude in the minute driving can be replaced by a relative (step) movement amount in the case of moving relatively (stepwise).

The AF operation according to the above-described embodiment is not limited to consumer digital cameras, but can also be applied to information portable terminals, such as smart phones and tablet terminals. The information portable terminals also include a wearable terminal. In addition, the AF operation according to the present embodiment can also be applied to a surveillance camera, a camera for a microscope, industrial equipment such as for an inspection, an observation device for various medical purposes, and an endoscope. For example, when the AF operation according to the present embodiment is used for an endoscope, in a case where the subject becomes unstable due to pulsation of an organ, etc., or in a case where a treatment tool, not an organ, enters an imaging range, etc., malfunction of the AF is suppressed. Furthermore, for example, when the AF operation according to the present embodiment is used for a surveillance camera, the AF is prevented from malfunctioning due to motions of coming and going figures.

Among the techniques described in the above embodiments, the control described mainly in the flowchart can be realized by using a program. This program can be stored in a recording medium or a recording unit. A method of recording on this recording medium or recording unit is varied, for example; recording may take place at the time of product shipment, via a distributed recording medium, or through downloading via the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
   an image sensor configured to receive light from a subject through an imaging lens including a focus lens to generate an imaging signal of a predetermined imaging area; and
   a controller configured to:
      set a focus detection area in an inside of the imaging area, and a motion detection area, at least a part of which is included in the focus detection area;
      determine an instability of the subject for a motion based on the imaging signal corresponding to an inside of the motion detection area;
      determine a degree of focusing based on the imaging signal corresponding to an inside of the focus detection area; and
      perform a focus adjustment operation for moving the focus lens for focus adjustment based on the degree of focusing,
   wherein the controller
      stops the focus adjustment operation when the subject is determined to be unstable,
      starts the focus adjustment operation after the subject is determined to be stable, and
      makes an operation parameter of the focus adjustment operation different, when the subject is determined to be unstable once and the focus adjustment operation is stopped and when the subject is then determined to be stable and the focus adjustment operation is resumed,
   wherein the controller determines the degree of focusing by the focus adjustment operation using minute driving of moving a center of an amplitude while reciprocating the focus lens with a predetermined amplitude,
   wherein the operation parameter is the amplitude or an amount of the movement of the focus lens, and
   wherein the controller
      sets a first focus detection area and a second focus detection area as the focus detection area, the second focus detection area being larger in area than the first focus detection area, and
      reduces an area of the second focus detection area when a focus detection result based on the first focus detection area and a focus detection result based on the second focus detection area indicate mutually opposite directions to move the focus lens, when the subject is determined to be unstable once, the focus adjustment operation is stopped, the subject is then determined to be stable, and the focus adjustment operation is resumed.

2. The imaging device according to claim 1, wherein the controller performs:
   the focus adjustment operation with the amplitude as a first value larger than a predetermined value to determine the degree of focusing when resuming the focus adjustment operation,
   the focus adjustment operation with the amplitude as a second value smaller than the first value when the degree of focusing becomes larger than a predetermined value, and
   the focus adjustment operation with the amplitude as a third value larger than the first value when the degree of focusing becomes smaller than a predetermined value.

3. The imaging device according to claim 1,
   wherein the controller relatively moves the focus lens to perform the focus adjustment operation,
   wherein the operation parameter is a relative movement amount of the focus lens in the focus adjustment operation, and
   wherein the controller performs:
      the focus adjustment operation with the relative movement amount as a first value larger than a predetermined value to determine the degree of focusing when the focus adjustment operation is resumed,
      the focus adjustment operation with the relative movement amount as a second value smaller than the first value when the degree of focusing becomes larger than a predetermined value, and the focus adjustment operation with the relative movement amount as a third value larger than the first value when the degree of focusing becomes smaller than a predetermined value.

4. The imaging device according to claim 1, wherein the controller detects a motion vector in the motion detection area, and determines an instability of the subject based on the motion vector.

5. The imaging device according to claim 4, wherein the controller obtains a total value of absolute values of the motion vectors for a predetermined number of frames of the imaging signal, and compares the total value with a predetermined value to determine the instability of the subject.

6. The imaging device according to claim 1, wherein the controller sets a plurality of areas as the motion detection areas, and determines the instability of the subject for each of the plurality of areas, and determines that the subject is unstable when the number of areas in which the subject is determined to be unstable exceeds a predetermined value.

7. The imaging device according to claim 1, further comprising a camera shake detector configured to detect shake of the imaging device,
wherein the controller does not perform the determination of the instability of the subject when the camera shake detector detects shake.

8. The imaging device according to claim 1, wherein the controller does not perform the determination of the instability of the subject when a contrast of the imaging signal corresponding to the inside of the motion detection area is smaller than a predetermined value.

9. The imaging device according to claim 1, wherein the controller determines that the subject is stable when a period during which the subject is determined to be stable is continued for a predetermined number of frames of the imaging signal, after determining that the subject is unstable once.

10. The imaging device according to claim 1, wherein the controller is further configured to perform a search operation of acquiring the imaging signal while continuously moving the focus lens in one direction to perform the focus adjustment operation, and
wherein the controller prohibits the search operation until a predetermined time elapses after being determined to be stable, when the subject is determined to be unstable once, the focus adjustment operation is stopped, the subject is then determined to be stable, and the focus adjustment operation is resumed.

11. The imaging device according to claim 1, wherein the controller is further configured to perform a standby operation of acquiring the imaging signal in a state in which the focus lens is stopped, and
wherein the controller prohibits the standby operation until a predetermined time elapses after being determined to be stable, when the subject is determined to be unstable once, the focus adjustment operation is stopped, the subject is then determined to be stable, and the focus adjustment operation is resumed.

12. A control method of an imaging device, comprising:
receiving light from a subject through an imaging lens including a focus lens to generate an imaging signal of a predetermined imaging area;
setting a focus detection area in an inside of the imaging area, and a motion detection area, at least a part of which is included in the focus detection area;
determining an instability of the subject with respect to a motion based on the imaging signal corresponding to an inside of the motion detection area;
determining a degree of focusing based on the imaging signal corresponding to an inside of the focus detection area;
performing a focus adjustment operation of moving the focus lens for focus adjustment based on the degree of focusing, wherein the focus adjustment operation is stopped when the subject is determined to be unstable, the focus adjustment operation is started after the subject is determined to be stable, and an operation parameter of the focus adjustment operation is made different when the subject is determined to be unstable once and the focus adjustment operation is stopped, and the subject is then determined to be stable and the focus adjustment operation is resumed;
setting a first focus detection area and a second focus detection area as the focus detection area, the second focus detection area being larger in area than the first focus detection area; and
reducing an area of the second focus detection area when a focus detection result based on the first focus detection area and a focus detection result based on the second focus detection area indicate mutually opposite directions to move the focus lens, when the subject is determined to be unstable once, the focus adjustment operation is stopped, the subject is then determined to be stable, and the focus adjustment operation is resumed,
wherein in the focus adjustment operation, the focus adjustment operation is performed using minute driving of moving a center of an amplitude while reciprocating the focus lens with a predetermined amplitude to determine the degree of focusing, and
wherein the operation parameter is the amplitude or an amount of the movement of the focus lens.

13. The control method of an imaging device according to claim 12,
wherein when the focus adjustment operation is resumed, the focus adjustment operation is performed with the amplitude as a first value larger than a predetermined value to determine the degree of focusing,
wherein the focus adjustment operation is performed with the amplitude as a second value smaller than the first value when the degree of focusing becomes larger than a predetermined value, and
wherein the focus adjustment operation is performed with the amplitude as a third value larger than the first value when the degree of focusing becomes smaller than a predetermined value.

14. The control method of an imaging device according to claim 12,
wherein the focus lens is moved relatively to perform the focus adjustment operation,
wherein the operation parameter is a relative movement amount of the focus lens in the focus adjustment operation, and
wherein, when the focus adjustment operation is resumed, the focus adjustment operation is performed with the relative movement amount as a first value larger than a predetermined value to determine the degree of focusing, the focus adjustment operation is performed with the relative movement amount as a second value smaller than the first value when the degree of focusing becomes larger than a predetermined value, and the focus adjustment operation is performed with the relative movement amount as a third value larger than the first value when the degree of focusing becomes smaller than a predetermined value.

15. A computer-readable non-transitory recording medium which stores a focus adjustment program executed by a computer that acquires, from an image sensor that receives light from a subject through an imaging lens including a focus lens and generates an imaging signal of a predetermined imaging area, the imaging signal,
wherein the focus adjustment program causes the computer to execute:
setting a focus detection area in an inside of the imaging area, and a motion detection area, at least a part of which is included in the focus detection area;
determining an instability of the subject with respect to a motion based on the imaging signal corresponding to an inside of the motion detection area;
determining a degree of focusing based on the imaging signal corresponding to an inside of the focus detection area;
performing a focus adjustment operation of moving the focus lens for focus adjustment based on the degree of focusing, wherein the focus adjustment operation is stopped when the subject is determined to be unstable, the focus adjustment operation is started after the subject is determined to be stable, and an operation parameter of the focus adjustment operation is made different when the subject is determined to be unstable once and the focus adjustment operation is stopped, and the subject is then determined to be stable and the focus adjustment operation is resumed;
in the focus adjustment operation, performing the focus adjustment operation using minute driving of moving a center of an amplitude while reciprocating the focus lens with a predetermined amplitude to determine the degree of focusing;
setting a first focus detection area and a second focus detection area as the focus detection area, the second focus detection area being larger in area than the first focus detection area; and
reducing an area of the second focus detection area when a focus detection result based on the first focus detection area and a focus detection result based on the second focus detection area indicate mutually opposite directions to move the focus lens, when the subject is determined to be unstable once, the focus adjustment operation is stopped, the subject is then determined to be stable, and the focus adjustment operation is resumed,
wherein the operation parameter is the amplitude or an amount of the movement of the focus lens.

16. The non-transitory recording medium according to claim 15, wherein the focus adjustment program causes the computer to execute:
when the focus adjustment operation is resumed, performing the focus adjustment operation with the amplitude as a first value larger than a predetermined value to determine the degree of focusing;
performing the focus adjustment operation with the amplitude as a second value smaller than the first value when the degree of focusing becomes larger than a predetermined value; and
performing the focus adjustment operation with the amplitude as a third value larger than the first value when the degree of focusing becomes smaller than a predetermined value.

17. The non-transitory recording medium according to claim 15, wherein the focus adjustment program causes the computer to relatively move the focus lens to perform the focus adjustment operation,
wherein the operation parameter is a relative movement amount of the focus lens in the focus adjustment operation, and
wherein the focus adjustment program causes the computer to execute:
when the focus adjustment operation is resumed, performing the focus adjustment operation with the relative movement amount as a first value larger than a predetermined value to determine the degree of focusing;
performing the focus adjustment operation with the relative movement amount as a second value smaller than the first value when the degree of focusing becomes larger than a predetermined value; and
performing the focus adjustment operation with the relative movement amount as a third value larger than the first value when the degree of focusing becomes smaller than a predetermined value.

* * * * *